April 5, 1932. J. W. LEIGHTON 1,852,319
END CONNECTION FOR VEHICLE SPRINGS
Filed Sept. 3, 1931 2 Sheets-Sheet 1
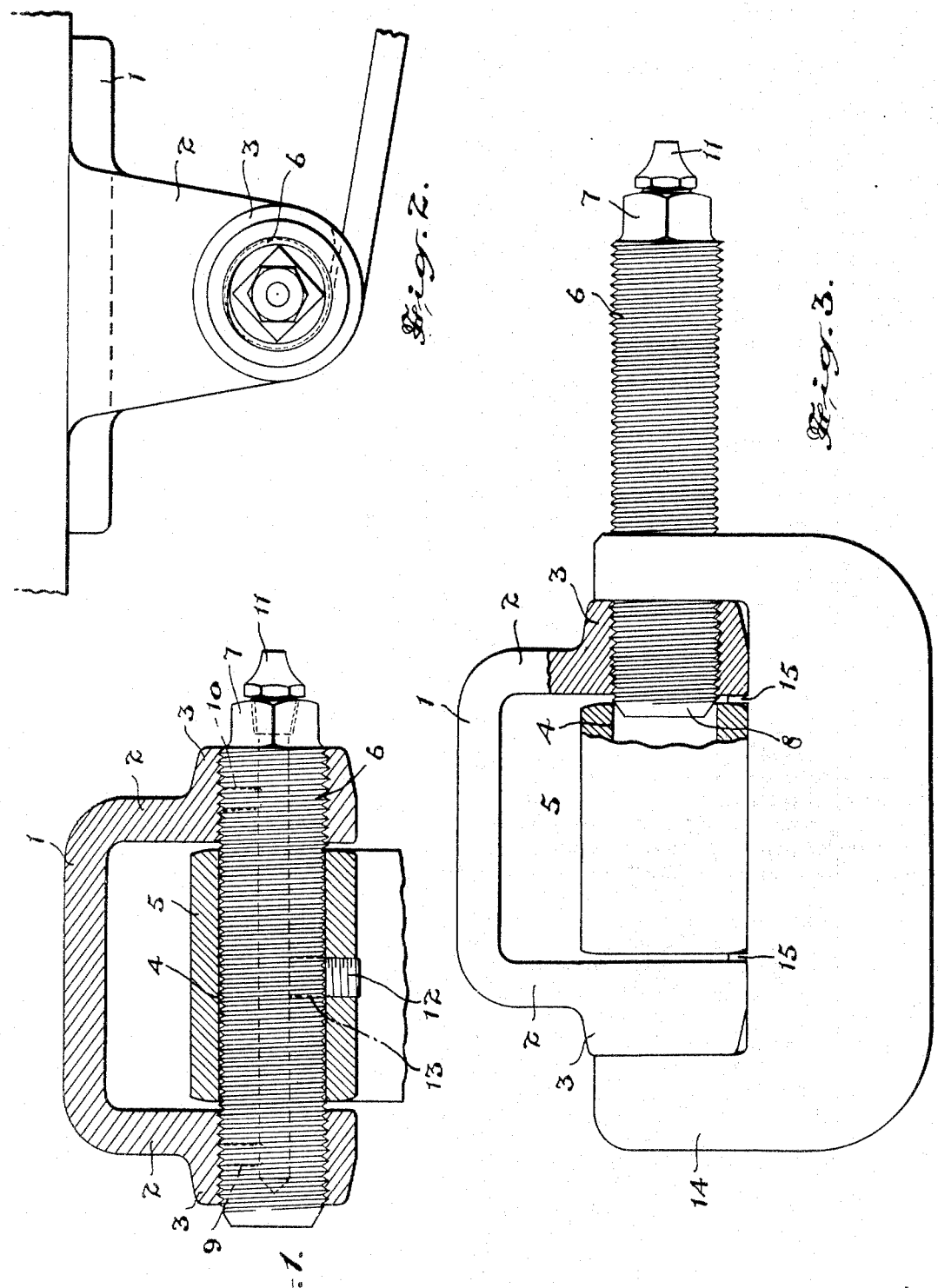
Inventor.
John Wycliffe Leighton.

April 5, 1932.    J. W. LEIGHTON    1,852,319
END CONNECTION FOR VEHICLE SPRINGS
Filed Sept. 3, 1931    2 Sheets-Sheet 2

Inventor.
John Wycliffe Leighton.
by
A J S Dennison
atty

Patented Apr. 5, 1932

1,852,319

UNITED STATES PATENT OFFICE

JOHN WYCLIFFE LEIGHTON, OF PORT HURON, MICHIGAN

END CONNECTION FOR VEHICLE SPRINGS

Application filed September 3, 1931. Serial No. 560,895.

The principal objects of this invention are to devise a connection for the end of a vehicle spring which will materially reduce the cost of manufacture and assembly and will effectively eliminate difficulties arising from side play and wear.

The principal feature of the invention consists in the novel use of a threaded bolt threaded into and extending between a pair of spaced members connected with either the spring or the member to be supported by the spring, said bolt being rigidly secured in the supporting member arranged between said spaced members and the threaded ends being rotatable in said spaced members.

In the accompanying drawings, Figure 1 is a longitudinal mid-sectional view through a connection for the end of a spring, constructed in accordance with this invention.

Figure 2 is an end elevational view of the form of the invention shown in Figure 1.

Figure 3 is an elevational part sectional view showing the clamping device for holding the bracket member during the insertion of the bolt.

Figures 4, 5:
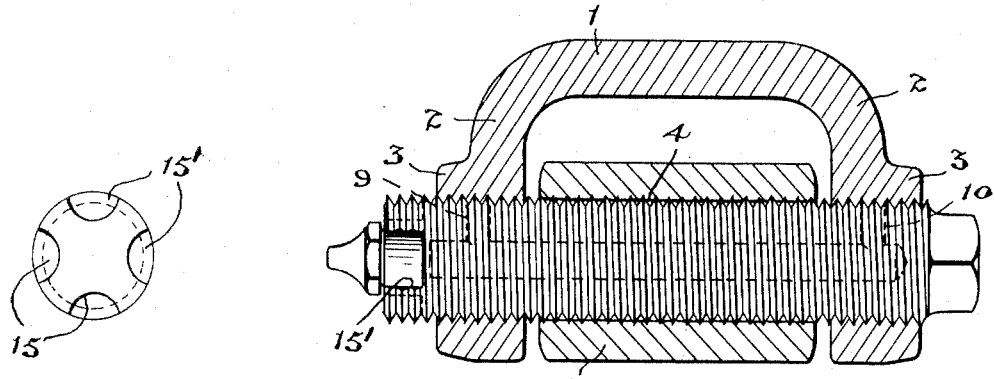
Figure 4 is a view similar to Figure 1 showing a modification of the bolt member to facilitate its placement in position.
Figure 5 is an end view of the bolt.

In the device shown in Figures 1 to 4 a bracket member 1 is adapted to be secured to the vehicle frame, and extending from the sides thereof are a pair of arms 2 preferably parallelly arranged and each of which is provided with an enlarged boss portion 3.

The bosses 3 are threaded and the external diameter of the thread is greater than the diameter of the bore 4 of the spring eye 5.

A bolt 6 is threaded from end to end with a thread which is a loose turning fit in the thread in the bracket bosses. The central portion of this bolt, equivalent to the length of the eye, is shown with the external diameter of the thread turned down so that it is appreciably less than the diameter of the full thread and so that when the bolt has been inserted through the eye of the spring end, the spring end will close in around the central portion and grip it securely and the bolt will then be held from turning and from accidentally moving out of the spring eye.

One end of the bolt is provided with an extension 7 with flat sides similar to a nut to enable the bolt to be turned and the other end 8 is preferably tapered to form a pilot.

The bolt is bored from end to a point adjacent to the other to form a lubricant passage and branch passages 9 and 10 extend therefrom to the threaded portions engaged by the boss ends of the arms. A suitable oil or grease connection 11 is attached to the open end of the bore of the bolt to keep it closed and to retain the lubricant therein.

The construction of the spring eye after the threaded end has been forced therethrough is sufficient to firmly grip the central reduced portion of the thread and prevents the bolt from turning in the spring eye, but it may be found desirable to more positively hold the bolt and this may be accomplished by the use of a set screw 12 inserted through and threaded in a hole in the spring eye and entering a recess 13 in the bolt.

In inserting the bolt in position in this form of the invention, it is preferable to use a clamp 14 as shown in Figure 3 which spans the outer ends of the bosses of the spaced arms 2 and is provided with spacer lugs 15 to extend between the inner faces of the arms and the spring eye 5 to hold the spring in its proper spaced relation equidistant between said arms.

The tapered end of the bolt is inserted into the threaded orifice in one of the arms and screwed thereinto until the taper surface 8 engages the inner perimeter of one end of the spring eye 5.

The continued turning of the bolt forces the tapered end into the spring eye 5, spreading it open, and the bolt thus passes through said eye and then engages the threaded boss 3 of the other arm 2.

The bolt is turned until the taper end 8 projects through the opposite arm which brings the reduced threaded portion into register with the spring eye 5 and the natural inward constriction of the eye, which has been spread apart by the full diameter portion of the bolt, then grips the reduced part.

During this operation the clamp member 14 holds the arms 2 from spreading and the spacer members 15 hold the arms in definite spaced relation with the ends of the spring eyes.

This clamp member 14 is removed after the bolt has been inserted in position in the manner described. The spring eye then grips the central part of the bolt and the bolt turns freely upon its threaded ends in the bosses 3 of the arms 2. The lubricant inserted into the central bore of the bolt finds its way to the threaded bearing surfaces through the passages 9 and 10 and keeps them properly lubricated.

It may be found desirable not to expand the spring eye over the full diameter of the bolt thread and in Figures 4 and 5 the bolt is shown as formed with notches 15' in the end which enables the bolt to partly cut its way through the spring eye as it is forced in by being turned. The eye may of course be tapped in a separate operation, but it is preferable to provide the bolt with a cutting end so that it will partly expand the spring eye and partly cut its way through and when through it will be seized and held tightly by the spring eye so that it will not turn when in use. By thus using the bolt as its own clearance tool the bolt will, when entered, be in proper relation to its supports, that is to say, the threads of the side arms and of the spring eye will be continuous.

Figure 6:
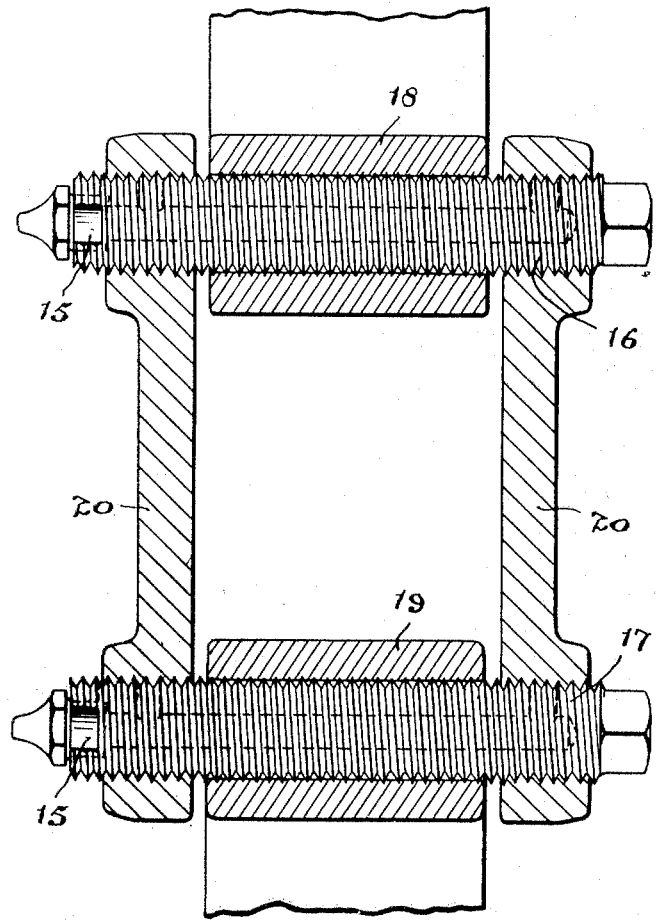
Figure 6 is a sectional view showing the application of the invention to a shackle structure.

In Figure 6 the invention is illustrated as applied to a shackle construction and the threaded bolts 16 and 17 are rigidly held in the frame lug 18 and spring end 19 while the shackles 20 are both rotatably mounted on the threaded ends of the bolts.

A spring connection such as described is extremely simple, it is very easily applied, it dispenses with numerous machining operations and it provides a bearing support which has a very extensive bearing surface, as the surfaces of the threads of the bolt engaging the threaded surfaces of the arms or shackles are practically double the length of the bosses.

The method of application is very simple and when the bolts are so secured the connection will operate indefinitely and with no appreciable wear. Further, the threaded surfaces eliminate all side play and consequent rattle.

The simplicity and cheapness of construction and of the manner of applying the device will be readily appreciated by those skilled in the art.

It will also be readily understood that as the eye member is of lesser length than the distance between the arms of the supporting member, and as this space is carefully retained by the spacer members 15 of the clamp 14 in assembling the parts so that neither of the arms will touch the eye member, the bolt being held rigidly in the eye member will, by reason of its threaded contact with the arms, hold them securely in their spaced relation.

What I claim as my invention is:

1. In an end connection for vehicle springs, the combination with an "eye" member, of a pair of arms spaced from the ends of said "eye" and having threaded orifices aligned with said "eye", and a threaded bolt extending through and secured in a fixed position in said "eye" and having its threaded ends rotatably engaging the threaded orifices in said arms and holding said arms free from surface contact at the side.

2. In an end connection for vehicle springs, the combination with an "eye" member, of a pair of arms arranged one at either end of said "eye" and spaced therefrom and each having a threaded orifice aligned with the bore of the "eye", and a bolt threaded from end to end and frictionally engaged about its central portion by said "eye" and having the threaded portions extending beyond both ends of the "eye" rotatably threaded in the threaded orifices of said arms and supporting same free from contact with said "eye".

3. In an end connection for vehicle springs, the combination with the eye end of a member, of a pair of arms spaced either side of said spring eye and having aligned threaded orifices arranged in alignment with the orifice through the "eye", a bolt threaded from end to end having its threaded end portions engaging the threaded orifices of the arms in rotative engagement and having a reduced central portion frictionally engaged by the spring eye.

4. In an end connection for vehicle springs, the combination with the eye end of the spring, of a pair of arms formed with internally threaded bosses spaced from the ends of the eye end of the spring, a bolt threaded from end to end and engaging the threads of said bosses in loose turning contact and having the outside diameter of the central portion slightly reduced to form a positioning recess to receive the constricted eye end of the spring, the ends of the eye abutting the shoulders at the ends of said recess and retaining the arms in spaced relation with the spring end.

5. In an end connection for vehicle springs, the combination with an "eye" member, of a pair of arms having aligned threaded orifices arranged either side of said eye, a bolt threaded from end to end to engage the threaded orifices and having an end adapted to work its way through said "eye", and means at the opposite end of said bolt for turning same to force the end through the spring eye.

6. In an end connection for vehicle springs, the combination with the eye connection, of a pair of arms extending either side of said eye and having aligned threaded orifices, a threaded bolt rotatably engaging the threaded orifices in said arms and frictionally engaging said eye connection, said bolt having a nut formation at one end and a tap formation at the other end.

JOHN WYCLIFFE LEIGHTON.